United States Patent
Lorenz et al.

(10) Patent No.: US 9,277,501 B2
(45) Date of Patent: Mar. 1, 2016

(54) ENVELOPE TRACKER DRIVEN TRANSMIT BEAMFORMING

(71) Applicant: Broadcom Corporation, Irvine, CA (US)

(72) Inventors: Robert Gustav Lorenz, Menlo Park, CA (US); Sriraman Dakshinamurthy, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 243 days.

(21) Appl. No.: 13/930,202

(22) Filed: Jun. 28, 2013

(65) Prior Publication Data

US 2014/0153461 A1    Jun. 5, 2014

Related U.S. Application Data

(60) Provisional application No. 61/803,021, filed on Mar. 18, 2013, provisional application No. 61/732,780, filed on Dec. 3, 2012.

(51) Int. Cl.
  *G08C 17/00*    (2006.01)
  *H04W 52/02*    (2009.01)

(52) U.S. Cl.
  CPC ............ *H04W 52/0245* (2013.01); *Y02B 60/50* (2013.01)

(58) Field of Classification Search
  USPC ............. 370/311; 330/127, 297, 75; 327/551, 327/553, 555
  See application file for complete search history.

(56) References Cited

U.S. PATENT DOCUMENTS

| | | |
|---|---|---|
| 6,674,856 B1 | 1/2004 | Hendricks et al. |
| 7,482,869 B2 | 1/2009 | Wilson |
| 7,764,060 B2 | 7/2010 | Wilson |
| 7,868,698 B2 | 1/2011 | Wilson |
| 8,093,945 B2 | 1/2012 | Wimpenny |
| 8,093,946 B2 | 1/2012 | Wimpenny et al. |
| 8,093,979 B2 | 1/2012 | Wilson |
| 8,106,713 B2 | 1/2012 | Wilson |
| 8,169,261 B2 | 5/2012 | Wilson |
| 8,294,522 B2 | 10/2012 | Flint et al. |
| 8,319,570 B2 | 11/2012 | Wilson |
| 2012/0270511 A1 | 10/2012 | Dakshinamurthy et al. |

OTHER PUBLICATIONS

Behravan, Ali, et al., Adaptive Predistorter Design for Nonlinear High Power Amplifiers, Chalmers University of Technology, Göteborg, Sweden, 2003, 4 pages.
Dahlman, Erik, et al., Key features of the LTE radio interface, Ericsson Review No. 2, 2008, 4 pages.

(Continued)

*Primary Examiner* — Phuongchau Ba Nguyen
(74) *Attorney, Agent, or Firm* — Brinks Gilson & Lione

(57) ABSTRACT

A method and telecommunication device in which the telecommunication device is provided with multiple antennas and power amplifiers to provide a beamformed transmit stage. An envelope tracking circuit helps achieve significant power savings in the power amplifier and can be used to provide the power supply for the multiple power amplifiers. A single envelope tracking power supply may be used to produce the supply voltage to the individual power amplifiers that operate on the transmit signal and its phase shifted variant. Accordingly, the user equipment experiences the benefits of both reduced power consumption using the envelope tracker and beam formed transmission.

18 Claims, 7 Drawing Sheets

(56) References Cited

OTHER PUBLICATIONS

Le Gallou, Nicolas, et al., Over 10MHz Bandwidth Envelope-Tracking DC/DC converter for Flexible High Power GaN Amplifiers, 2011 IEEE MTT-S International Microwave Symposium, Baltimore, Maryland, 2011, 4 pages.

LTM 9003, 12-Bit Digital Pre-Distortion µModule Receiver Subsystem, Linear Technology Corporation, Milpitas, California, downloaded May 2013, 24 pages.

Schow, C.L., et al., Transmitter Pre-Distortion for Simultaneous Improvements in Bit-Rate, Sensitivity, Jitter, and Power Efficiency in 20 Gb/s CMOS-driven VCSEL Links, Optical Society of America, 2011, 3 pages.

Basic PA Linearization Concepts: Predistortion Techniques vs. Operation in Backoff, Scintera Networks, Inc., 2009-2011, 3 pages.

Seydou, N., Efficient Digital Baseband Predistortion for Modern Wireless Handsets, Georgia Institute of Technology, Dec. 2009, 133 pages.

GC5322, Wideband Digital Pre-Distortion Transmit IC Solution, Texas Instruments Incorporated, 2008, 4 pages.

GC5325, Wideband Digital Predistortion Transmit Processor, Texas Instruments Incorporated, 2009, 24 pages.

GC5328, Low-Power Wideband Digital Predistortion Transmit Processor, Texas Instruments Incorporated, 2009, 27 pages.

Verfaillie, G., White paper Equalising and Predistortion: The Equalink™ concept, Newtec Cy N.V., 2008, 8 pages.

ENVELOPE TRACKER DRIVEN TRANSMIT BEAMFORMING

CROSS REFERENCE TO RELATED APPLICATIONS

This application claims priority to U.S. Provisional Application Ser. No. 61/803,021, filed Mar. 18, 2013, and to U.S. Provisional Application Ser. No. 61/732,780, filed Dec. 3, 2012, which are incorporated herein by reference in their entirety. This application is also related to U.S. patent application Ser. No. 13/023,539, filed on Feb. 8, 2011, and U.S. Provisional Patent Application Ser. No. 61/302,214 filed on Feb. 8, 2010, which are incorporated herein by reference in their entirety.

TECHNICAL FIELD

This disclosure relates generally to signal transmission. More particularly, this disclosure relates to envelope tracker-driven transmit beamforming in a telecommunication system.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries. Improvements in wireless communication devices, particularly in their ability to reduce power consumption, will help continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
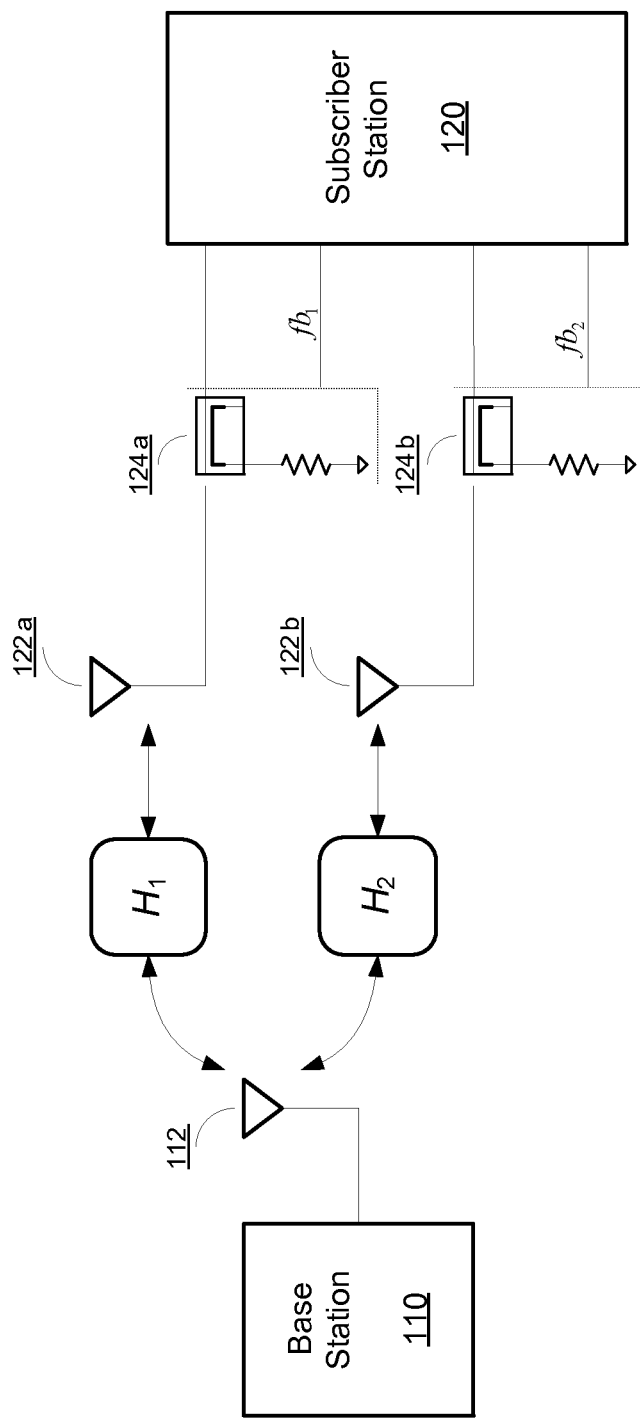
FIG. 1 is a diagram illustrating an exemplary communication system that is operable to support uplink beamforming calibration, in accordance with an embodiment of the invention.

Certain embodiments of the invention may be found in a method and system for uplink beamforming in a multi-antenna communication system. In various embodiments of the invention, a wireless transceiver, comprising a transmitter, a receiver, and an antenna array, may be operable to determine a desired time-varying transmit phase relationship between a plurality of antennas based on radio frequency signals received by the plurality of antennas, and a phase difference in the receiver path and a phase difference between the transmitter path to each of the plurality of antennas.

In one aspect, uplink beamforming may be performed using envelope tracking in a multi-antenna communication system. This relates to uplink beamforming in which envelope beamforming is use to drive a plurality of power amplifiers. We can adjust the transmit signal such that the modulus of the two signals is the same. In the case of a time varying complex signal I+Q, its modulus is defined as the absolute value of the signal, or $\sqrt{I^2+Q^2}$. The modulus of the complex signal is unaffected by applying a constant phase shift, described as $e^{j\phi}$ to the signal.

The present disclosure seeks to exploit this insensitivity to constant phase shift. This may have particular utility in a time division duplexing (TDD) system, although it can be applied more generally to other types of systems such as frequency division duplexing (FDD) as well. In one aspect, a radio transmit receive chain can receive signals from two or more antennas. A circuit can measure the relative phase shift between the two received signals. The transmit receive chain can then transmit a phase-shifted version so that the signal lines up coherently at the base station, i.e., beamforming. The signals are transmitted by two or more power amplifiers coupled to a number of amplifiers. An additional constraint may be applied in that the system will use a constant phase shift. This allows use of a single envelope tracking switching power supply to drive both power amplifiers. The transmitted signals transmitted by both power amplifiers are thus phase-shifted versions of the same signal, having the same modulus, which allows them to be driven by the same envelope tracking switching power supply. The envelope tracking switching power supply tracks the envelope of the input signal which is of course the same for both output signals.

One benefit is a saving of the power consumption due to the overhead on the envelope tracking switching power supply. Another benefit is reduction in physical components or surface area on an integrated circuit along with the concomitant reduction in cost and improvement in efficiency.

A radio channel can change over time. Ideally, a transmitter will transmitter will transmit to a base station or other remote radio a signal having the phase conjugate of the received signal from the base station. For example, if the path is slightly shorter from the base station to the second of two antennas of a mobile device, this path length difference is compensated on the uplink such that the transmitted signals from the two antennas add coherently at the base station. Therefore, the mobile station will transmit the same amplitude signal shifted in phase on a frequency selective basis. To enjoy the benefits of eliminating one envelope tracking switching power supply, it is proposed to use a common phase shift for both transmitted signals in a way that maximizes the received signal to noise ratio at the base station. We approximate the frequency-selective phase difference as a single phase value.

The received radio frequency signals are communicated from one or more antennas of a base station. Two or more of the plurality of antennas, and corresponding transmit power levels may be selected, based upon characteristics determined from the received RF signals. An exemplary characteristic is received signal strength, commonly referred to as RSSI. The wireless transceiver may transmit RF signals to the base station utilizing the selected transmit antennas wherein the phase relationship between the transmitted signals is responsive to the measured receive phase differences. The received RF signals may comprise subcarriers overlapping with subcarriers allocated by the base station to the antenna array for transmission. The receiver performance of the wireless transceiver may be determined from the received RF signals on a frequency selective basis or on a non-frequency selective basis. The desired transmit phase may be computed on a frequency selective or a non-frequency selective basis.

During transmission, the transmit power and the transmit phase of the transmitting RF signals may be measured. The transmit phase relationship may be dynamically adjusted based on the transmit RF measurements, and the desired transmit phase. One or more transmit antennas in the antenna array may be dynamically selected based on the received RF signals, or the characterized transmit channel qualities. Previously computed channel characteristics and the desired transmit phase may be utilized to transmit subsequent RF signals.

FIG. 1 is a diagram illustrating an exemplary communication system that is operable to support uplink beamforming calibration, in accordance with an embodiment of the invention. Referring to FIG. 1, there is shown a communication system 100. The communication system 100 comprises a base station 110 and a subscriber station 120.

The base station 110 may comprise suitable logic, circuitry, interfaces or code that are operable to manage and schedule communication resources in an uplink direction or downlink direction to users of various subscriber stations such as the subscriber station 110. The base station 110 may be coupled to an antenna 112 that may be utilized to communicate information with subscriber stations such as the subscriber station 120 in an uplink or downlink direction. Although a single antenna 112 is illustrated for the base station 110, the invention may not be so limited. Accordingly, two or more antennas may be utilized by the base station 110 to support the uplink beamforming calibration without departing from the spirit and scope of various embodiments of the invention.

A subscriber station such as the subscriber station 120 may comprise suitable logic, circuitry, interfaces or code that are operable to communicate information with the base station 110. The subscriber station 120 may transmit or receive radio frequency (RF) signals over radio channels established between the subscriber station 120 and the base station 110. The strength of the received RF signals from the base station 110 may vary depending on channel conditions such as, for example, fluctuating signal strength levels or additive interference from neighboring base stations. Depending on device capabilities, the subscriber station 120 may communicate information with the base station 110 utilizing various access technologies such as, for example, UMTS, LTE or WiMAX.

The subscriber station 120 may also be operable to communicate information with the base station via an antenna array 122 coupled to the subscriber station 120. The antenna array 122 may comprise a plurality of antenna 122a-122b each connected to a different RF processing path or RF chain within the subscriber station 120. The antenna array 122 may enable spatial-domain signal processing and thereby mitigate interferences.

The subscriber station 120 may also be operable to calculate the phase relationship between the transmitter paths, coupled by the directional couplers 124a and 124b to the antennas 122a-122b, by cross-correlating down-converted samples of the transmit signals with the respective baseband signal applied to each transmitter chain or path. The subscriber station 120 may be operable to control or adjust the transmit phase relationships between the antennas 122a-122b. The transmit phase relationships between the antennas 122a-122b may be selected or assigned on a frequency selective basis and on the basis of the receive phase differences. For example, an OFDM (Orthogonal Frequency Division Multiplexing) channel may comprise a plurality of subcarriers. In this regard, the transmit phase relationships between the antennas 122a-122b may be adjusted on a subcarrier-by-subcarrier basis or on the basis of groups of subcarriers.

An RF directional coupler such as the RF directional coupler 124a may comprise suitable logic, circuitry, and interfaces that are operable to control power levels on signals communicated via the antenna 122a. In an embodiment of the invention, a single RF directional coupler may be coupled to each of the plurality of antennas 122a-122b, respectively. For example, the antenna 122a and the antenna 122b may be coupled with an RF directional coupler 124a and an RF directional coupler 124b, respectively. The RF directional couplers 124a and 124b may be operable to couple a small portion of the transmitter outputs to the corresponding feedback paths denoted $fb_1$ and $fb_2$. The RF directional coupler 124a may be a bidirectional device. In this regard, the single RF directional coupler 124a may be utilized for both the transmit path and the receive path to antenna 122a. The RF directional coupler 124a may be operable to allow one or more samples of a RF transmit signal, which is an input to the RF directional coupler 124a, to be extracted from the RF transmit signal. In this regard, the amplitude or the phase delays of the RF transmit signal through the transmit path to the antenna 122a may be measured or calculated utilizing the extracted samples In an exemplary embodiment of the invention, during the transmit interval, the subscriber station 120 may control or adjust the transmit phase relationships between the antennas 122a-122b such that for each frequency, the transmit phase difference between the antennas 122a-122b is the negative of the receive phase difference between the antennas 122a-122b, as measured at the antennas 122a-122b. Let $\phi_{Rx,1}(f, t_{Rx})$ and $\phi_{Rx,2}(f, t_{Rx})$ denote the receive phases of the antenna 122a and the antenna 122b, at frequency f and at time of reception $t_{Rx}$. Let $\phi_{Tx,1}(f, t_{Tx})$ and $\phi_{Tx,2}(f, t_{Tx})$ denote the transmit phases of the antenna 122a and the antenna 122b, at frequency f and at time of transmission, $t_{Tx}$. The transmit phase relationship between the antenna 122a and the antenna 122b, during the transmit interval $t_{Tx}$, may be profitably chosen to satisfy the relationship of $$\phi_{Tx,2}(f, t_{Tx})-\phi_{Tx,1}(f, t_{Tx})=-(\phi_{Rx,2}(f, t_{Rx})-\phi_{Rx,1}(f, t_{Rx})) \quad (1)$$

To satisfy this relationship, three phase relationships may be considered, namely the actual phase difference of the wireless channels, the phase difference between the transmit paths, and the phase difference between the receive paths. The phase difference of the channel may be estimated as the phase difference between the filtered channel estimates. Let $\angle(\bullet)$: $C^N \rightarrow [0, 2\pi)^N$ denotes the angle operator and let $\angle(\hat{H}_1(f))$ and $\angle(\hat{H}_2(f))$ denote the phases of the channel estimates. Then, $$\phi_{Rx,2}(f) - \phi_{Rx,1}(f) = \measuredangle(\hat{H}_2(f)) - \theta_{Rx,2} - (\measuredangle(\hat{H}_1(f)) - \theta_{Rx,1}) + \eta \quad (2)$$
$$= \measuredangle(\hat{H}_2(f)) - \measuredangle(\hat{H}_1(f)) - (\theta_{Rx,2} - \theta_{Rx,1}) + \eta$$

where $\eta \in [-\pi, \pi)^N$ is a noise induced error term. Let $\theta_{Tx,2} - \theta_{Tx,1}$ denote the difference in phase between the first and second transmit paths and let $\hat{\phi}_{BB,1}$ and $\hat{\phi}_{BB,2}$ denote the phase of the signals applied to the transmit chains. To effect the desired output phase relationship, the phases of the signals applied to the transmitters may need to be compensated according to:

$$\hat{\phi}_{BB,2} - \hat{\phi}_{BB,1} = \phi_{Tx,2} - \phi_{Tx,1} + (\theta_{Tx,2} - \theta_{Tx,1}) \quad (3)$$

The phase differences $(\theta_{Rx,2} - \theta_{Rx,1})$ and $\theta_{Tx,2} - \theta_{Tx,1}$ vary with temperature, frequency, and from device to device and are not known exactly. We may estimate these quantities. When the estimated quantities are used in place of the actual values, (1) becomes $$\hat{\phi}_{BB,2} - \hat{\phi}_{BB,1} = -(\phi_{Rx,2}(f, t_{Rx}) - \phi_{Rx,1}(f, t_{Rx})) \quad (4)$$
$$= -(\measuredangle(\hat{H}_2(f)) - \measuredangle(\hat{H}_1(f))) + (\hat{\theta}_{Rx,2} - \hat{\theta}_{Rx,1}) - (\hat{\theta}_{Tx,2} - \hat{\theta}_{Tx,1})$$

By measuring the transmit phases and the receive phases to a common point, namely, at the directional couplers 124a and 124b, phase differences due to board layout may drop out.

In an exemplary embodiment of the invention, the subscriber station 120 may be operable to assign or determine transmit phase differences between the antennas 122a-122b on a tile-by-tile basis. In OFDMA systems such as WiMAX, the uplink tiles span a narrow range of frequencies. Therefore, the channel typically varies by only a small amount across the tile and the channel for all subcarriers within this group may be effectively characterized by a single metric. In WiMAX systems, the set of tiles constituting a subchannel do not change during the uplink subframe. This may allow assignment of tiles to individual antennas without concern that subsequent assignment, on subsequent symbols, may result in the same tile being transmitted on different antennas on different symbols. This may be true even in the case of, for example, subchannel rotation in, WiMAX systems.

The selection of the transmit phase relationship between the antenna 122a and the antenna 122b may be on a non-frequency selective basis. In this regard, a constant phase offset may be utilized to approximate $(\theta_{Rx,2} - \theta_{Rx,1})$ over all frequencies.

In an exemplary embodiment of the invention, the subscriber station 120 may be operable to dynamically select or adjust the transmit phase relationships between a plurality of antennas of the antenna array 122. For example, the subscriber station 120 may dynamically adjust the phase relationships between antennas of the antenna array 122 based on receive signal characteristics associated with each antenna of the antenna array 122. These receiver signal characteristics may comprise receive signal strength, signal-to-noise ratio, signal strength, estimated interference power, and the variance of the received signal.

The subscriber station 120 may be operable to perform transmit antenna selection based on the receiver performance through each antenna of the antenna array 122. In this regard, the subscriber station 120 may determine one or more receiver antennas corresponding to the strongest receive power levels. One or more transmit antennas may be selected from the determined receiver antennas. The subscriber station 120 may be operable to adaptively select one or more transmit antennas based on the characterized channel qualities. In this regard, the transmission channel qualities may be characterized across the subcarriers of the multi-carrier signals. The subscriber station 120 may manage and control when to calibrate the transmit path associated with each of the selected transmit antennas in accordance with the assigned transmit phase differences.

In an exemplary embodiment of the invention, the subscriber station 120 may be operable to characterize transmission channel qualities associated with each of the antennas of the antenna array 122 on a frequency selective basis. For example, in instances where at least one received signal comprises pilot or reference tones of a preamble of a downlink sub-frame from the base station 110, the subscriber station 120 may characterize the pilot or reference tones of the received preamble. Specifically, the subscriber station 120 may characterize the pilot or reference tones of the received preamble if subcarriers of the preamble may overlap with one or more groups of subcarriers to be allocated to one or more transmit antennas during transmission.

Figure 2:
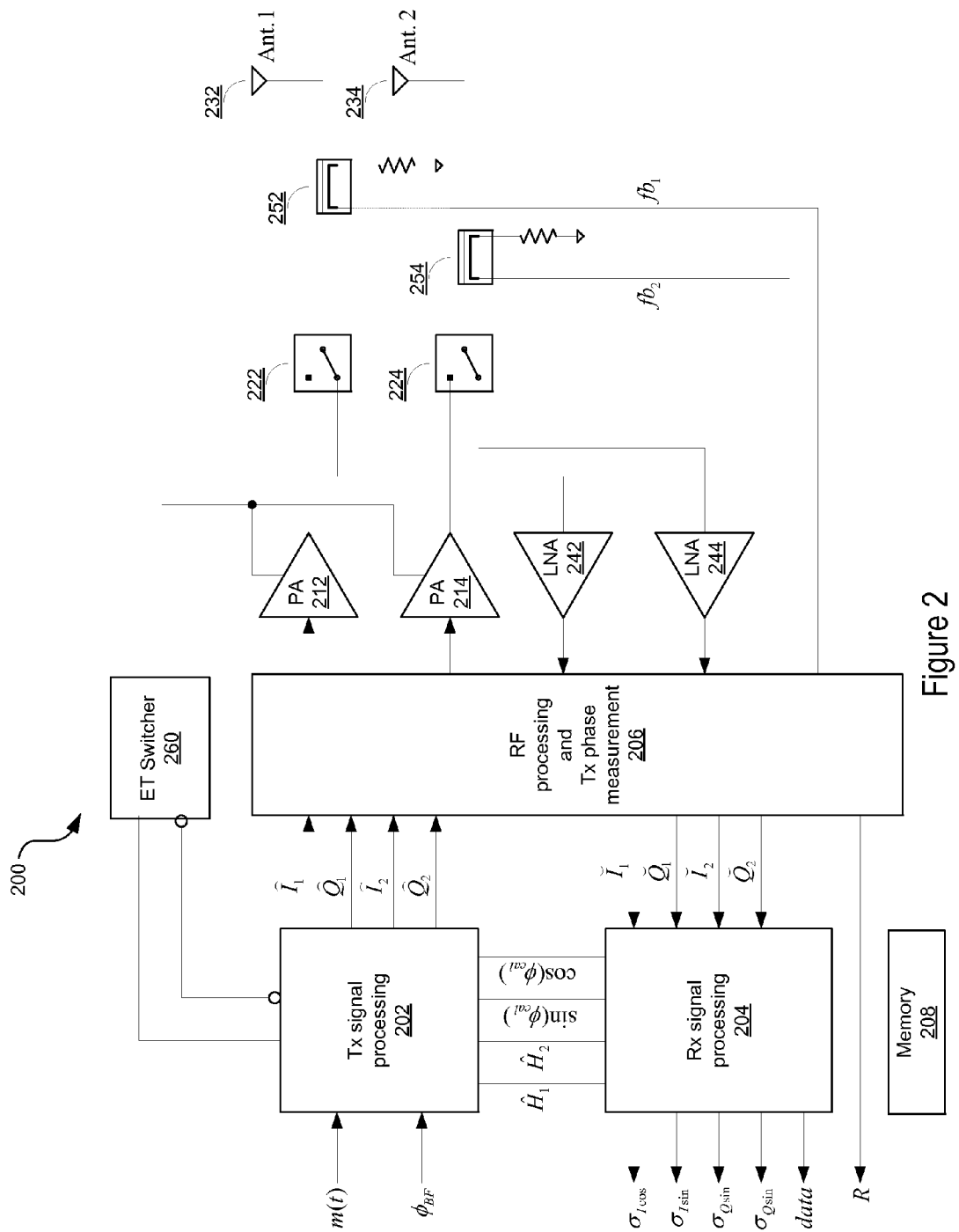
FIG. 2 is a block diagram illustrating an exemplary wireless transceiver that is operable to perform uplink beamforming, in accordance with an embodiment of the invention.

FIG. 2 is a block diagram illustrating an exemplary wireless transceiver that is operable to perform uplink beamforming. Referring to FIG. 2, there is shown a subscriber station transceiver 200. The subscriber station transceiver 200 comprises a transmit (Tx) signal processing unit 202, a receive (Rx) signal processing unit 204, a radio frequency (RF) signal processing and Tx phase measurement unit 206, a memory 208, power amplifiers 212 and 214, transmit/receive (T/R) switches 222 and 224, low noise amplifiers (LNAs) 242 and 244, RF directional couplers 252 and 254, antennas 232 and 234 and an envelope tracking (ET) switching power supply (ET switcher) 260.

The subscriber station transceiver 200 may comprise suitable logic, circuitry, interfaces or code that may be operable to receive or transmit radio frequency signals using various cellular communication technologies such as, for example, CDMA, GSM, UMTS, WiMAX, HSPA, or LTE.

The RF signal processing and Tx phase measurement unit 206 may include suitable logic, circuitry, interfaces or code that are operable to process RF signals communicated via antennas 232 and 234. In this regard, the RF signal processing and Tx phase measurement unit 206 may be operable to process RF signals received from a remote radio such as the base station 110. The RF signal processing and Tx phase measurement unit 206 may convert the received RF signals to corresponding baseband signals and perform analog-to-digital conversion of the downconverted signals. The resulting digitized receive signals, denoted as $\hat{I}_1$, $\hat{Q}_1$ for signals received from a first antenna 232, and $\hat{I}_2$, and $\hat{Q}_2$ for signals received from a second antenna 234, may be communicated with the Rx signal processing unit 204 for further baseband processing. The RF signal processing and Tx phase measurement unit 206 may also be operable to process RF signals for transmission to the base station 110. The RF signal processing and Tx phase measurement unit 206 may receive digital baseband signals, denoted as $\hat{I}_1$, $\hat{Q}_1$, $\hat{I}_2$ and $\hat{Q}_2$, from the Tx signal processing unit 202 and perform digital-to-analog conversion of the received digital baseband signals. The RF signal processing and Tx phase measurement unit 206 may be operable to convert the resulting analog baseband signals to corresponding RF signals for transmission via the antennas 232 and 234 to a remote radio such as the base station 110.

A RF directional coupler may be coupled to each one of the antennas 232 and 234. For example, the RF directional coupler 252 may be located between the T/R switch 222 and the antenna 232. Similarly, the RF directional coupler 254 may be located between the T/R switch 224 and antenna 234. The RF directional couplers 252 and 254 may provide samples of the RF transmit signals to the RF signal processing and Tx phase measurement unit 206 through feedback signals $fb_1$ and $fb_2$. The coupled output of the directional coupler 252, for example, may be approximately 18 dB below the input to the directional coupler 252. In this case, the signal loss due to the directional coupler 252 is small as compared to the gains it affords or provides by enabling beamforming. In this regard, the amplitude or the phase delays of the corresponding RF transmit signals input to the RF couplers 252 and 254 may be measured or calculated by subsequent processing of these feedback signals. The amplitude or phase delay measurements may be utilized to characterize and adjust the transmit phase relationship between antennas of the antennas 232 and 234.

The Tx signal processing unit 202 may include suitable logic, circuitry, interfaces or code that may be operable to manage or control operations of the RF signal processing and Tx phase measurement unit 206. The Tx signal processing unit 202 is further described in detail in conjunction with FIG. 5. In an exemplary embodiment of the invention, the Tx signal processing unit 202 may be operable to determine a phase difference between the baseband Tx paths. For example, the TX signal processing unit 202 may select a single phase difference that maximizes the received power at a remote radio such as the base station 110. The Tx signal processing unit 202 may apply the determined phase difference through various operations such as performing an inverse Discrete Fourier Transform (IDFT), upsampling and filtering the output of IDFT signal.

The Rx signal processing unit 204 may include suitable logic, circuitry, interfaces or code that may be operable to manage or control operations of the RF signal processing and Tx phase measurement unit 206. The Rx signal processing unit 204 may perform various baseband procedures such as channel estimation, frequency tracking, demodulation of the receive signals, and estimation of the receiver phase in conjunction with the calibration signals. The Rx signal processing unit 204 is further described in detail in conjunction with FIG. 4.

The memory 208 may include suitable logic, circuitry, interfaces or code that may be operable to store information such as executable instructions and data that may be utilized by the Rx signal processing unit 204, the Tx signal processing unit 202 or other device components such as, for example, the RF signal processing and Tx phase measurement unit 206. The memory 208 may include RAM, ROM, low latency nonvolatile memory such as flash memory or other suitable electronic data storage.

The ET switcher 260 is operative to provide a dynamically variable power supply voltage to the power amplifiers 212, 214. The ET switcher 260 is operative to receive a transmit signal from the TX signal processing unit 202. The transmit signal may be the I and Q signals produced by the TX signal processing unit 202. The ET switcher 260 responds to the transmit signal by generating a power supply voltage for the power amplifiers 212, 214. In particular, the ET switcher 260 responds to the envelope of the transmit signal to vary the magnitude of the power supply voltage provided to the power amplifiers 201, 214. By varying the magnitude of the power supply voltage, the ET switcher 260 reduces power consumption and improves efficiency in the power amplifiers 212, 214. In accordance with the illustrated embodiment, a single envelope tracking power supply, ET switcher 260, provides the power amplifier power supply voltage to all respective power amplifiers 212, 214. Consolidating the envelope tracking switching power supply in a single ET switcher 260 allows elimination of the overhead of additional ET switchers for multiple power amplifiers. The overhead eliminated includes current drain or power supply and physical area on a semiconductor chip or circuit board.

In an exemplary operation, baseband signals may be communicated between the Tx signal processing unit 202 and the RF signal processing and Tx phase measurement unit 206. For example, assume that $(\hat{I}_1, \hat{Q}_1)$ and $(\check{I}_1, \check{Q}_1)$ are the baseband signals that are transmitted and received, respectively, via the antenna 232. $(\hat{I}_2, \hat{Q}_2)$ and $(\check{I}_2, \check{Q}_2)$ are the baseband signals that are transmitted and received, respectively, via the antenna 234. In various exemplary embodiments of the invention, the Rx signal processing unit 204 may utilize the received $(\check{I}_1, \check{Q}_1)$ and $(\check{I}_2, \check{Q}_2)$ to characterize the receive channels associated with the antennas 232 and 234. Characteristics of the receive channels include amplitude, capacity, signal strength, MIMO capacity, and equivalent SINR. The Rx signal processing unit 204 may be operable to correlate at least one of the received $(\check{I}_1, \check{Q}_1)$ and $(\check{I}_2, \check{Q}_2)$ with a sinusoidal signal to measure the phase of the receive path. The sinusoidal signal may be generated using a numerically controlled oscillator (NCO) in conjunction with a lookup table to generate the sine and cosine values of the NCO phase $\phi_{cal}$. The NCO phase $\phi_{cal}$ may be profitably coupled to the RF signal processing and Tx phase measurement unit 206. In this way, the phase $\phi_{cal}$ of the NCO is common to both the calibration signal and the correlation measurement and therefore the initial phase of the NCO is immaterial.

As seen in equation (4) above, three phase relationships, namely, the actual phase difference between the wireless channels, the phase difference between the transmit paths, and the phase difference between the receive paths, need to be considered in order to optimally compute the transmit phase difference to be applied. In this regard, the phase difference of the wireless channels may be generally frequency selective. The phase difference between the transmit paths, $\theta_{Tx,2} - \theta_{Tx,1}$, and the phase difference between the receive paths, $\theta_{Rx,2} - \theta_{Rx,1}$, may be generally a weak function of frequency. Hence, we may compensate for both the receiver and transmitter phase differences with a single or common term, $\phi_{BF} = \hat{\theta}_{Rx,2} - \hat{\theta}_{Rx,1} - (\hat{\theta}_{Tx,2} - \hat{\theta}_{Tx,1})$. We approximate the frequency selective phase correction $\measuredangle(\hat{H}_1(f)) - \measuredangle(\hat{H}_2(f))$ as a single channel phase value for channel estimates $\hat{H}_1(f)$ and $\hat{H}_2(f)$ from the Rx signal processing unit 204 to the Tx signal processing unit 202 as shown. Separately applying the frequency selective phase difference $\measuredangle(\hat{H}_1(f)) - \measuredangle(\hat{H}_2(f))$ and $\phi_{BF}$ affords an additional advantage; namely, the transmit phase component of $\phi_{BF}$ may be estimated and compensated at the beginning of an uplink transmission, hence reducing the latency of this phase term. In other words, we choose a single phase difference that maximizes the received power at the base station based on the measured receive channel and the difference between the receiver and transmitter calibration delays.

Ideally, we would like to calibrate the receiver and the transmitter and develop a variety of electrical parameters. We can optimize a function to develop a single phase to develop a single phase that maximizes received power at the base station.

Figure 3:
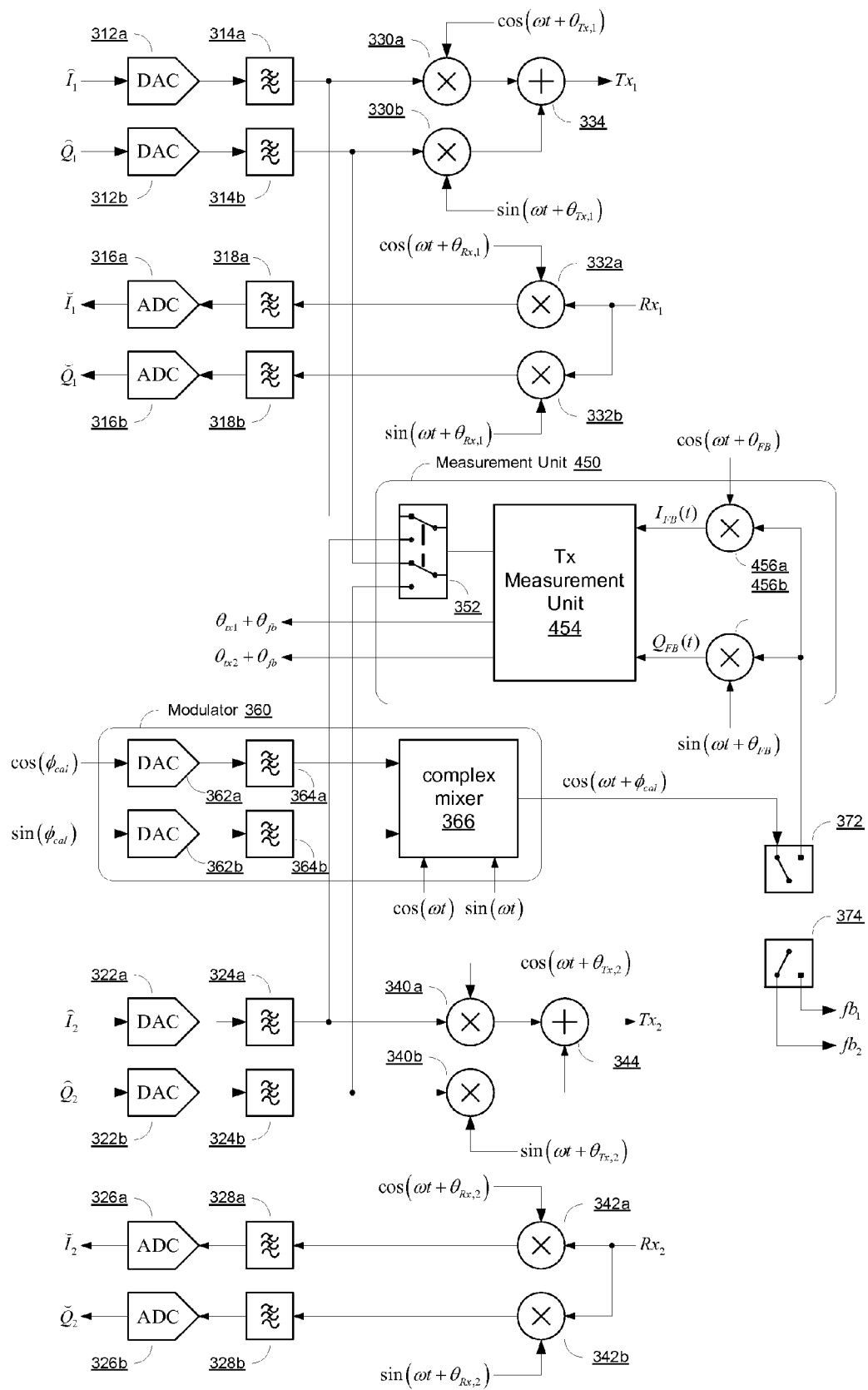
FIG. 3 is a block diagram illustrating an exemplary radio frequency (RF) signal processing unit that may be utilized for uplink beamforming calibration, in accordance with an embodiment of the invention.

FIG. 3 is a block diagram illustrating an exemplary radio frequency (RF) signal processing unit that may be utilized for uplink beamforming calibration, in accordance with an embodiment of the invention. Referring to FIG. 3, there is shown a RF signal processing unit 300 comprising a plurality of RF paths such as RF paths 310, 320, a calibration generator 360, and a measurement unit 350. Two switches 372 and 374 provide for an ability to switch feedback ports $fb_1$ and $fb_2$ to either connect to the Tx measurement unit 350 or the calibration generator unit 360.

The RF path 310 includes digital-to-analog converter (DACs) 312a, 312b, analog-to-digital converter (ADCs) 316a, 316b, low pass filters 314a, 314b, and 318a, 318b, transmit mixers 330*a*, 330*b*, receive mixers 332*a*, 332*b*, and adder 334. The RF path 320 comprises DACs 322*a*, 322*b*, ADCs 326*a*, 326*b*, low pass filters 324*a*, 324*b*, and 328*a*, 328*b*, transmit mixers 340*a*, 340*b*, adder 344, and receive mixers 332*a*, 332*b*.

The measurement unit 350 includes a switch 352, down conversion mixers 356*a*, 356*b*, and a Tx measurement unit 354. The Tx measurement unit 354 may comprise suitable logic, circuitry, interfaces or code that may be operable to measure the amplitude or the phase of transmit signals. The measurement unit 350 may process feedback signals, $fb_1$ and $fb_2$, to control the calibration of the amplitude or phase of the transmit signals through the antenna 232 and the antenna 234, respectively. The feedback path signal is down converted and may be denoted as a vector signal $Y_{FB}$, which comprises the real and imaginary components of the baseband signal.

The switch 352 is configured to select between one of the pairs of baseband analog transmit signals, from $X_1$ and $X_2$, to provide a selected signal, X, to the Tx measurement unit 354. In an embodiment, the feedback path switches 374 and 372 are configured to route the corresponding feedback path signal to the Tx measurement unit 354 for processing; that is, to measure the relative phase difference between the selected pair of baseband analog transmit signals and the transmitter output corresponding to said selected pair of baseband analog transmit signals. In this way, the phase the selected transmitter chain may be measured. In an alternate embodiment, a pair of baseband analog transmit signals applied to a first transmit pair are measured with respect to the feedback path of a second transmit path. This embodiment may be profitably used if the transmit path employs a multiport network between the power amplifiers and the directional couplers.

Figure 4:
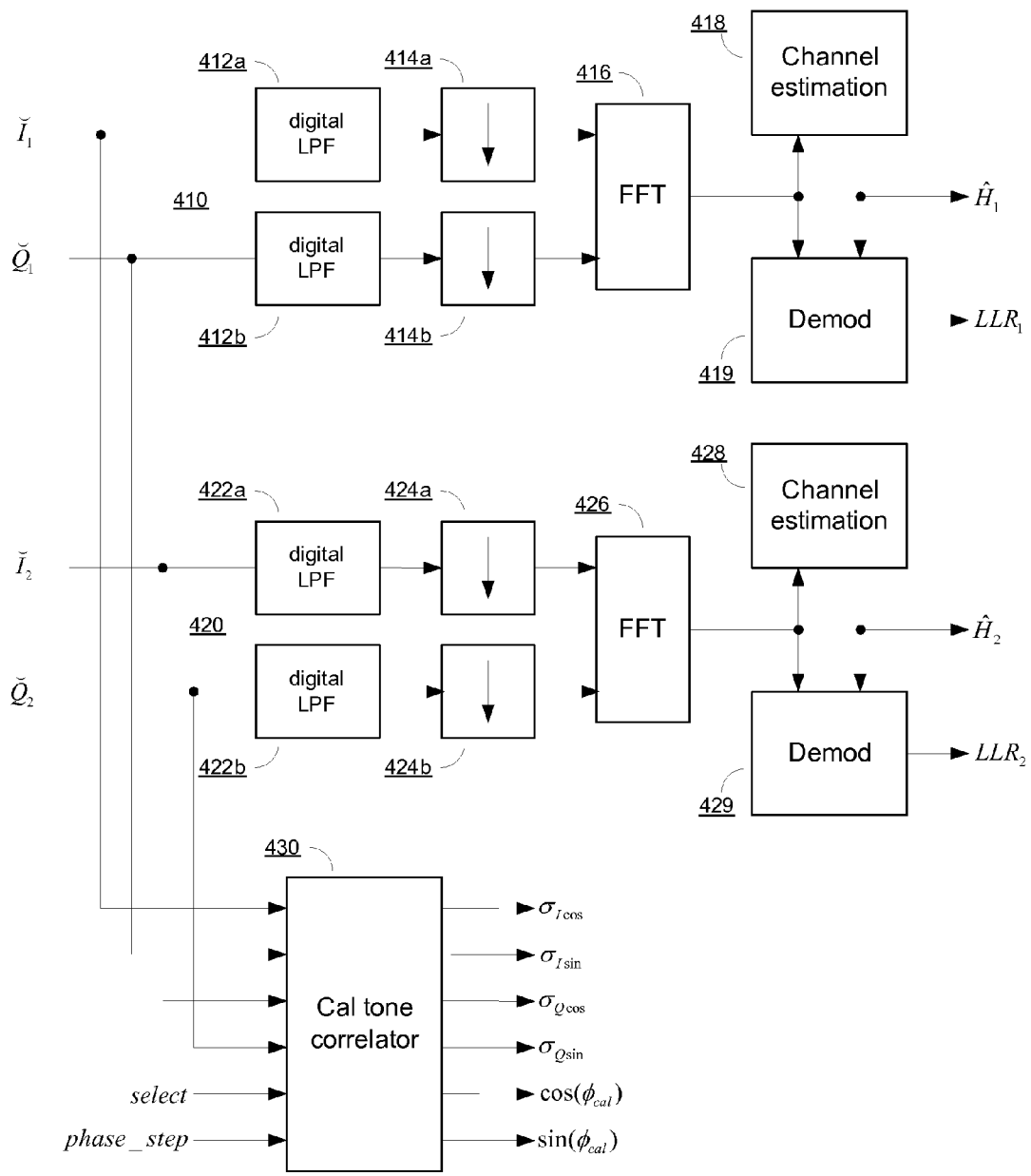
FIG. 4 is a block diagram illustrating an exemplary baseband receive digital signal processing unit that may be utilized for beamforming, in accordance with an embodiment of the invention.

The transmit signals $X_1$ and $X_2$ commonly undergo a phase shift through the RF sections of the subscriber station 120. The exact phase shift is unknown and varies. This phase shift may be caused by several on chip and off chip components such as transmit mixer, local oscillator phase differences, RF amplifiers, matching networks, Power Amplifier (PA), and directional coupler. In the case in which the subscriber is transmitting and $fb_1$ is selected, the coupled path connection to the feedback circuit creates an additional phase shift. The coupled feedback signal, $Y_{FB}$, may then have an uncertain relationship to the baseband transmit signal $X_1$ used for up conversion. In addition to the phase shift, the transmit signal may also comprise an unknown gain. The nominal gain experienced by the signal path may be predicted or estimated, but the variation from part to part, and temperature and bias conditions can result in large gain variation between $X_1$ and $Y_{FB}$. The same uncertainties apply to the transmission of $X_2$ and the feedback path when $fb_2$ is selected. In an exemplary embodiment of the invention, the Tx measurement unit 354 may be used to estimate the gain and phase difference between these two signals. Let us define $Y_{FB}$ such that:

$$Y_{FB} = \begin{bmatrix} I_{FB}(t) \\ Q_{FB}(t) \end{bmatrix} \quad (5)$$

where $I_{FB}(t)$ and $Q_{FB}(t)$ shown in FIG. 3, are respectively the real and imaginary parts of the complex feedback signal $Y_{FB}$, such that $$I_{FB}(t) = \Re(Y_{FB}(t)),\ Q_{FB}(t) = \Im(Y_{FB}(t)). \quad (6)$$

where $\Re(\cdot):\mathbb{C}\to\mathbb{R}$ and $\Im(\cdot):\mathbb{C}\to\mathbb{R}$ extract the real and imaginary components of a complex value. Signals $X_1$ and $X_2$, shown in FIG. 4, are similarly defined as according to:

$$X_1(t) = \begin{bmatrix} \hat{I}_1(t) \\ \hat{Q}_1(t) \end{bmatrix} \quad (7)$$

and $$X_2(t) = \begin{bmatrix} \hat{I}_2(t) \\ \hat{Q}_2(t) \end{bmatrix}. \quad (8)$$

Equivalently, $$\hat{I}_1(t) = \Re(X_1(t))\ \hat{Q}_1(t) = \Im(X_1(t)) \quad (9)$$

$$\hat{I}_2(t) = \Re(X_2(t))\ \hat{Q}_2(t) = \Im(X_2(t)) \quad (10)$$

The switches 374 and 372 in FIG. 3, are configured such that the feedback signal $Y_{FB}$ is a sample of the first feedback signal $fb_1$. Under this configuration, the feedback signal $Y_{FB}$ may be expressed in the following matrix form:

$$\begin{bmatrix} I_{FB}(t) \\ Q_{FB}(t) \end{bmatrix} = g_1 \begin{bmatrix} \cos(\theta_{Tx,1}+\theta_{fb}) & \sin(\theta_{Tx,1}+\theta_{fb}) \\ -\sin(\theta_{Tx,1}+\theta_{fb}) & \cos(\theta_{Tx,1}+\theta_{fb}) \end{bmatrix} \begin{bmatrix} \hat{I}_1(t) \\ \hat{Q}_1(t) \end{bmatrix}, \quad (11)$$

where the terms $g_1$ and $\theta_{Tx,1}+\theta_{fb}$, denote the relative gain and phase of the feedback signal with respect to the first transmit signal. Further, the phase may be expressed as a sum of two terms, such that $\theta_{Tx,1}$ represents the phase of the first transmit path that comprises the phase shift up to the directional coupler 252, for example, and $\theta_{fb}$ may represent the phase of the feedback coupled path. The following equation represents a more general relationship between the first transmit signal and the feedback signal.

$$\begin{bmatrix} I_{FB}(t) \\ Q_{FB}(t) \end{bmatrix} = \begin{bmatrix} m_{11} & m_{12} \\ m_{21} & m_{22} \end{bmatrix}\begin{bmatrix} \hat{I}_1(t) \\ \hat{Q}_1(t) \end{bmatrix} + \begin{bmatrix} O_{I1} \\ O_{Q1} \end{bmatrix} \quad (12)$$

where the matrix $$\begin{bmatrix} m_{11} & m_{12} \\ m_{21} & m_{22} \end{bmatrix}$$

denotes an impairment experienced by the feedback signal that is proportional to the input signal, and the matrix $$\begin{bmatrix} O_{I1} \\ O_{Q1} \end{bmatrix}$$

represents an constant offset term that is independent of the input signal.

In an exemplary embodiment of the invention, the switch 352 of FIG. 3 may be chosen such that the Tx measurement unit 354 may have simultaneous access to both the first transmit signal $X_1$ and the feedback signal $Y_{FB}$. The Tx measurement unit 354 may compute the correlation terms $$R_{XX} = \sum_{i=1}^{N_{samples}} XX^T \in \mathbb{R}^{2\times 2}$$

and $$R_{YX} = \sum_{i=1}^{N_{samples}} Y_{FB} X^T \in \mathbb{R}^{2\times 2}$$

over a plurality of samples $N_{sample}$ may be chosen to correspond to a period of approximately 5 us, which allows the phase or gain to be measured and compensated for at the beginning of an uplink transmission. In an alternate embodiment, $N_{samples}$ may be chosen to correspond to a transmit symbol period. An increased correlation period generally results in improved estimation accuracy.

A matrix of impairments M can be computed as according to:

$$M = \begin{bmatrix} m_{11} & m_{12} \\ m_{21} & m_{22} \end{bmatrix} = R_{YX} R_{XX}^{-1} = \left[\sum Y_{FB} X^T\right]\left[\sum X_1 X^T\right]^{-1} \quad (13)$$

Subsequently, the constituent gain and phase of the first transmit signal can be derived as $$g_1 = \sqrt{\frac{m_{11}^2 + m_{12}^2 + m_{21}^2 + m_{22}^2}{2}} \quad (14)$$

and, $$\theta_{Tx,1} + \theta_{fb} = \frac{\angle(m_{11} - jm_{21}) + \angle(m_{22} + jm_{12})}{2} \quad (15)$$

In an exemplary embodiment of the invention, the respective gain and phase terms $g_2$, and $\theta_{tx2}+\theta_{fb}$ of the second transmit signal can be similarly computed by configuring switch 352 to select $X=X_2$ and configuring switches 372, 374 to cause $Y_{FB}$ to be coupled to signal $fb_2$. Equations (11) through (15) may now be re-applied to calculate the gain and phase terms of the second transmit path.

The calibration generator 360 may comprise suitable logic, circuitry, interfaces or code that may be operable to create a modulated signal $\cos(\omega t + \phi_{cal}(t))m$, where $\omega$ is the angular frequency corresponding to the center frequency of the received signal. In an embodiment, $\phi_{cal}(t)=n\Delta ft$, $n \in \mathbb{Z}$ and $\Delta f$ is the subcarrier spacing. That is, the calibration signal is a continuous wave signal that appears at an integer frequency offset relative to the received OFDM signal. The calibration signal may be coupled through feedback signals $fb_1$ and $fb_2$, to the RF couplers 252 and 254, for example. In an embodiment, a common phase $\phi_{cal}(t)$ is used for both the generation of the receive calibration and the correlation of the downconverted receive signals. Recall from (4) that:

$$\hat{\phi}_{BB,2} - \hat{\phi}_{BB,1} = -(\angle(\hat{H}_2(f)) - \angle(\hat{H}_1(f)) + (\hat{\theta}_{Rx,2} - \hat{\theta}_{Rx,1}) - (\hat{\theta}_{Tx,2} - \hat{\theta}_{Tx,1}).$$

The advantage of using the directional coupler for both receive and transmit calibration and a common path for both the transmit and receive calibration may now be appreciated. As any phase delay in the feedback path to a first directional coupler is common to both the estimated transmit and receive phase estimates, the phase delay of the feedback cancels from the correction term $\hat{\phi}_{BB,2} - \hat{\phi}_{BB,1} = (\hat{\theta}_{Rx,2} - \hat{\theta}_{Rx,1}) - (\hat{\theta}_{Tx,2} - \hat{\theta}_{Tx,1})$.

Hence, the accuracy of the beamforming phase calibration is not affected by phase variation in the feedback path arising from manufacturing variations or circuit board layout.

In operation, the RF signal processing unit 300 may be operable to perform RF processing for transmitting and receive signals. The RF path 310 may be utilized to process RF signals communicated via the antenna 232. The RF path 320 may be utilized to process RF signals communicated via the antenna 234. In an embodiment, RF paths 310 and 320 are equivalent.

FIG. 4 is a block diagram illustrating an exemplary baseband receive digital signal processing unit that may be utilized for beamforming, in accordance with an embodiment of the invention. Referring to FIG. 4, there is shown a digital signal processing unit 400 comprising a plurality of baseband (BB) processing paths such as BB paths 410, 420, and a cal-tone correlator 430. The BB path 410 comprises digital low pass filters (LPF) 412, 412b, decimators 414a, 414b, a FFT module 416, a channel estimation unit 418, and a demodulator 419. The BB path 420 comprises LPFs 422a, 422b, decimators 424a, 424b, a FFT module 426, a channel estimation unit 428, and a demodulator 429.

The BB path 410 may comprise suitable logic, circuitry or interfaces that are operable to process baseband signals corresponding to RF signals communicated via the antenna 232.

The digital LPF 412a and the decimator 414a may comprise suitable logic, circuitry, interfaces or code that are operable to process I components of the baseband signals. The digital LPF 412b and the decimator 414b may comprise suitable logic, circuitry, interfaces or code that are operable to process Q components of the baseband signals. The outputs of the decimators 414a and 414b may be input to the FFT module 416.

The FFT module 416 may comprise suitable logic, circuitry, interfaces or code that may be operable to perform FFT operation on the input signals to convert the baseband samples in time domain into corresponding samples in frequency domain.

The channel estimation unit 418 may comprise suitable logic, circuitry, interfaces or code that may be operable to estimate channel utilizing the samples in frequency domain from the output of the FFT module 416.

The demodulator 419 may comprise suitable logic, circuitry, interfaces or code that may be operable to demodulate the samples in frequency domain from the output of the FFT module 416 in order to extract information, transmitted from the base station 110, from the received RF signals via the antenna 232.

The BB path 420 processes corresponding baseband signals for RF signals communicated via the antenna 234.

The digital LPF 422a and the decimator 424a may comprise suitable logic, circuitry, interfaces or code that are operable to process I components of the baseband signals. The digital LPF 422b and the decimator 424b may comprise suitable logic, circuitry, interfaces or code that are operable to process Q components of the baseband signals. The outputs of the decimators 414a and 414b may input to the FFT module 426.

The FFT module 426 may comprise suitable logic, circuitry, interfaces or code that may be operable to perform FFT operation on the input signals to convert the baseband samples in time domain into corresponding samples in frequency domain.

The channel estimation unit 428 may comprise suitable logic, circuitry, interfaces or code that may be operable to estimate channel utilizing the samples in frequency domain from the output of the FFT module 426.

The demodulator 429 may comprise suitable logic, circuitry, interfaces or code that may be operable to demodulate the samples in frequency domain in order to extract information, transmitted from the base station 110, from the received RF signals via the antenna 234.

The outputs of channels estimation units 418 and 428, denoted $\hat{H}_1(f)$ and $\hat{H}_2(f)$ may be applied to baseband transmit digital signal processing to produce a desired frequency selective phase shift between the antennas according to (4).

The cal-tone correlator 430 may comprise suitable logic, circuitry, interfaces or code that may be operable to correlate the digitized down-converted RF signals with a baseband equivalent of the RF calibration signal applied through a directional coupler through a feedback signal. The RF calibration signal may be applied through a signal that is shared with the transmit phase estimation circuitry. The RF calibration signal may be applied through a package pin that is shared between transmit and receive phase estimation. The digitized down-converted RF signals for the first antenna are denoted as $\check{I}_1$ and $\check{Q}_1$; The digitized down-converted RF signals for the second antenna are denoted as $\check{I}_2$ and $\check{Q}_2$. The output of the cal-tone correlator 430 may be accumulated to calculate the complex amplitude of the baseband equivalent response of a receive RF path. The complex amplitude of two or more receive paths may be measured and the phase difference between said measured RF paths may be computed. The measured receive path phase difference may be used to compensate the measured channel phase differences when computing a desired transmit phase according to (4). In addition, the cal-tone correlator 430 may output the signals used in the correlation accumulation $\sin(\phi_{cal}(t))$, $\cos(\phi_{cal}(t))$; these signals may be advantageously coupled to the calibration modulator 360. If the calibration modulator is responsive to the signal used in the correlation, the absolute value of the phase $\phi_{cal}(t)$ need not be compensated for.

The calculated receive power levels over the one or more groups of subcarriers may be utilized to calibrate subsequent received signals, and may also be applied to calibrate transmit power level and transmit phase correction. In this regard, the wireless transceiver 200 may be operable to calibrate the receive path and transmit path for each of antennas 232 and 234.

In an exemplary operation, RF signals received via the antenna 232 and the antenna 234 may be RF processed over the RF path 310 and the RF path 320, respectively. The resulting baseband I and Q components may be processed by the BB paths 410 and 420. The digital signal processing unit 400 may be operable to evaluate the characteristics of the receive channel and of the receiver path associated with each of the antennas 232 and 234. The phase shifts and amplitudes associated with the cal tone correlator may be used in conjunction with the channel estimates in selecting a desired transmit phase according to (4).

Figure 5:
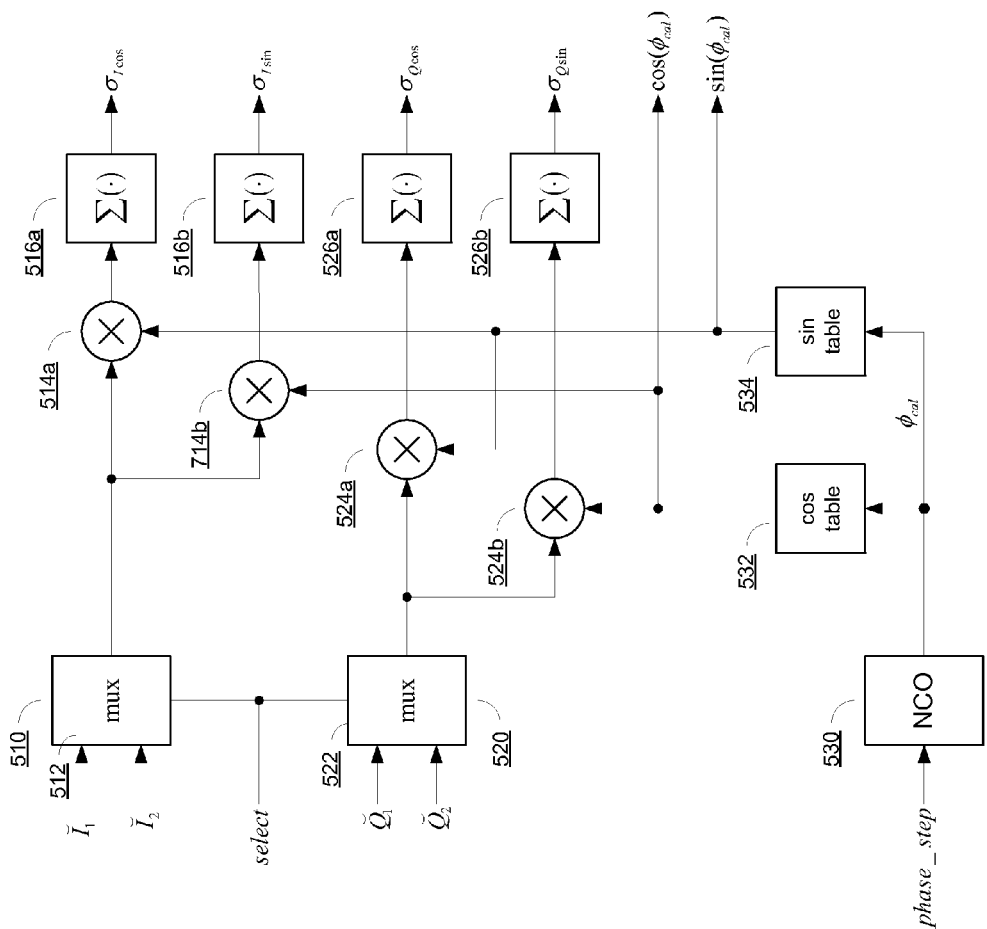
FIG. 5 is a block diagram illustrating an exemplary baseband transmit digital signal processing unit that may be utilized for beamforming, in accordance with an embodiment of the invention.

FIG. 5 is a block diagram illustrating an exemplary baseband transmit digital signal processing unit that may be utilized for beamforming, in accordance with an embodiment of the invention. Referring to FIG. 5, there is shown a calibration tone (cal-tone) correlator 500 comprising an I path 510, a Q path 520, a numerically controlled oscillator (NCO) 530, a cos table 532 and a sin table 534.

The I path 510 may comprise suitable logic, circuitry, or interfaces that is operable to process I components of baseband signals corresponding to RF signals communicated to antennas 232 and 234. The Q path 520 may comprise suitable logic, circuitry, interfaces or code that is operable to process Q components of the baseband signals.

The multiplexer (MUX) 512 may comprise suitable logic, circuitry, interfaces or code that may be operable to multiplex I components of the baseband signals over the antennas 232 and 234. The multiplexer (MUX) 522 may comprise suitable logic, circuitry, interfaces or code that may be operable to multiplex Q components of baseband signals over the antenna 232 and 234.

The mixer 514a may comprise suitable logic, circuitry, interfaces or code that may be operable to mix the multiplexed I components ($\check{I}_1$, $\check{I}_2$) with $\cos(\phi_{Cal})$, where $\phi_{Cal}$ is the receive phase estimate and the value of $\phi_{Cal}$ may be generated by the NCO 530.

The mixer 514b may comprise suitable logic, circuitry, interfaces or code that may be operable to mix the multiplexed I components ($\check{I}_1$, $\check{I}_2$) with $\sin(\phi_{Cal})$, where $\phi_{Cal}$ is the receive phase estimate and the value of $\phi_{Cal}$ may be generated by the NCO 530.

The mixer 524b may comprise suitable logic, circuitry, interfaces or code that may be operable to mix the multiplexed Q components ($\check{Q}_1$, $\check{Q}_2$) with $\cos(\phi_{Cal})$, where $\phi_{Cal}$ is the receive phase estimate and the value of $\phi_{Cal}$ may be generated by the NCO 530.

The mixer 524b may comprise suitable logic, circuitry, interfaces or code that may be operable to mix the multiplexed Q components ($\check{Q}_1$, $\check{Q}_2$) with $\sin(\phi_{Cal})$, where $\phi_{Cal}$ is the receive phase estimate and the value of $\phi_{Cal}$ may be generated by the NCO 530.

The integrators 516a-516b and 526a-526b may comprise suitable logic, circuitry, interfaces or code that may be operable to accumulate the output signals from the mixers 514a, 514b and 524a, 524b, respectively. In this regard, the integration widow utilized by the integrators 516a, 516b and 526a, 526b may comprise one more symbols depending on system configuration.

The NCO 530 may comprise suitable logic, circuitry, interfaces or code that may be operable to provide a phase estimate $\phi_{cal}$ to the cos table 532 and the sin table 534. The outputs of the cos table 532 and the sin table 534 may be communicated to the I path 510 and the Q path 520 to perform phase calibration of the receive path, namely, the I path 510 and the Q-path 520, to antennas 232 and 234.

The cos table 532 is a sine look-up table that provides a cos value for angles generated by the NCO 530.

The sin table 534 is a sine look-up table that provides a sin value for angles generated by the NCO 530.

In an exemplary operation, the MUX 512 may be operable to multiplex I components of the baseband signals over the antennas 232 and 234. The multiplexed I components may be phase 90-degree phase shifted for the given receive phase estimate $\phi_{cal}$. For example, the multiplexed I components may be mixed via the mixer 514a with $\sin(\phi_{cal})$, and may be mixed via the mixer 514a with $\cos(\phi_{cal})$, respectively. The integrator 516a may be operable to accumulate the output of the mixer 514a to generate a receive power level imbalance over the I path 510 in terms of $\cos(\phi_{cal})$. The integrator 516b may be operable to accumulate the output of the mixer 514b to generate a receive power level imbalance over the I path 510 in terms of $\sin(\phi_{cal})$. Similarly, the MUX 522 may be operable to multiplex Q components of the baseband signals over the antennas 232 and 234. The multiplexed Q components may be 90-degree phase shifted for the given receive phase estimate $\phi_{cal}$. The resulting phase shifted Q components may be utilized to generate a receive power level imbalance over the Q path 510 in terms of $\cos(\phi_{cal})$ and $\sin(\phi_{cal})$, respectively.

In various exemplary aspects of the method and system uplink beamforming calibration in a multi-input-multi-output communication system, a wireless transceiver such as the subscriber station transceiver 200, comprising a transmitter and a receiver, is coupled to a plurality of antennas 232 and 234. The subscriber station transceiver 200 may receive RF signals via said plurality of antennas from one or more antennas of the base station 110. The subscriber station transceiver 200 may be operable to determine transmit phase relationship such as transmit phase difference between said plurality of antennas based on the received RF signals. For example, the receiver RF signals may be processed to determine receiver performance such as receive signal strength and receive data rate at the subscriber station transceiver 200. The subscriber station transceiver 200 may be operable to determine transmit phase relationship between a plurality of antennas based on the determined receiver performance. One or more transmit antennas such as the antennas 232 and 234 and corresponding transmit power levels may be selected based on the determined transmit phase relationship and the determined receiver performance.

The subscriber station transceiver 200 may transmit RF signals to the base station 110 utilizing the selected transmit antennas 232 and 234 at the selected transmit power levels. The received RF signals from the base station 110 may comprise subcarriers that may overlap with one or more groups of subcarriers to be allocated to a plurality of antennas 232 and 234. In other words, the received RF signals may be transmitted, from the base station 110, in subcarriers that may comprise at least a portion of subcarriers allocated by the base station 110 to the subscriber station 120 for transmission.

The performance for the reception of the RF signals from the base station may be performed on a frequency selective basis or on a non-frequency basis. The determined receiver performance may comprise receive signal strength, signal-to-noise ratio, signal strength, date rate, the variance of the received signal, and various receive error rates such as BER and FER for the received RF signals. In this regard, the subscriber station transceiver 200 may calibrate each receive path to a plurality of antennas 232 and 234 based on the determined receive performance. For example, receiving power levels may be adjusted, at the LNAs 319*a* and 319*b*, based on the receive signal strength indicated in the determined receive performance.

During transmission, the subscriber station transceiver 200 may perform RF measurement on the transmitting RF signals. In this regard, the transmit power and the transmit phase of the transmitting RF signals may be determined or calculated utilizing samples extracted from the transmitting RF signals through the directional couplers 252 and 254, for example. The subscriber station transceiver 200 may be operable to dynamically adjust transmit phase relationship between a plurality of antennas based on the transmit power measurements and the transmit phase measurements over the selected transmit antennas 232 and 234, and the determined receive signal characteristics associated with antennas 232 and 234.

The subscriber station transceiver 200 may characterize or determine transmit channel qualities for a plurality of antennas based on the transmit power measurements and the transmit phase measurements over the selected transmit antennas 232 and 234, the selected transmit phase relationship and the determined receiver performance. The subscriber station transceiver 200 may dynamically select a plurality of transmit antennas based on the adjusted transmit phase relationship, the characterized transmit channel qualities and the determined receiver performance. In this regard, the dynamically selected transmit power levels indicate that the majority of transmission power at the subscriber station transceiver 200 may be directed to the selected transmit antennas. The subscriber station transceiver 200 may transmit subsequent RF signals to the base station 110 utilizing the dynamically selected transmit antennas at the selected transmit power levels.

Figure 6:
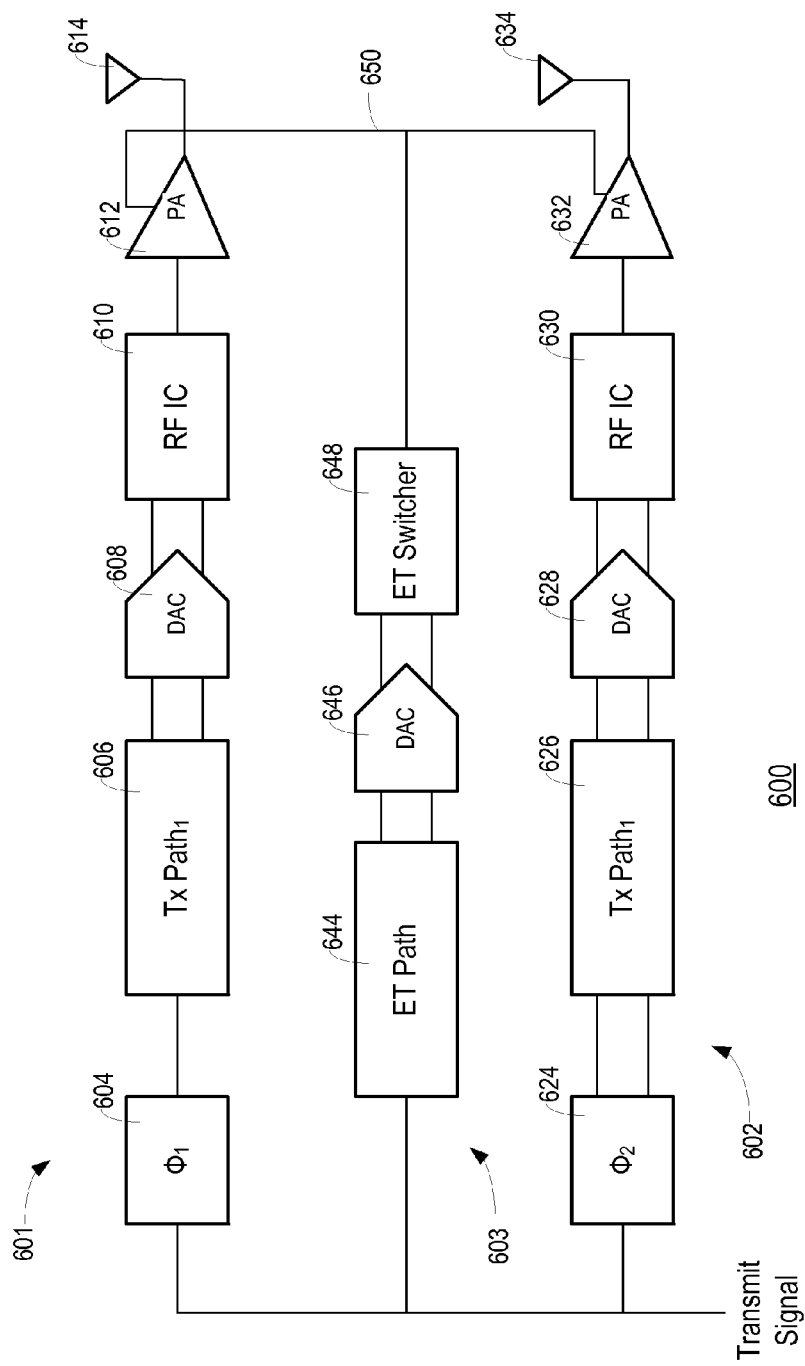
FIG. 6 is a block diagram illustrating an exemplary wireless transceiver that is operable to perform uplink beamforming, in accordance with an embodiment of the invention.

FIG. 6 is a block diagram illustrating an exemplary wireless transceiver 600 that is operable to perform uplink beamforming, in accordance with an embodiment of the invention. The wireless transceiver 600 may be a portion of a telecommunication device such as a radiotelephone, a mobile station for use in a mobile radio system or any user equipment. The wireless transceiver 600 includes a first transmit circuit 601, a second transmit circuit 302 and an envelope tracking circuit 603. The wireless transceiver 600 receives a transmit signal for transmission to a remote radio such as a base station 110 (FIG. 1). The transmit signal is applied to the first transmit circuit 601, the second transmit circuit 602 and the envelope tracking circuit 603.

The first transmit circuit 601 is suitable for transmission of radio signals to a remote radio. The first transmit circuit 601 includes a phase shift 604, a transmit path 606, a digital to analog converter (DAC) 608, a radio frequency integrated circuit (RF IC) 610, a power amplifier (PA) 612 and an antenna 614. The phase shift 604 is representative of the phase shift imposed by the first transmit circuit 601 between the received transmit signal and radio frequency (RF) signals transmitted at the antenna 614. The transmit path 606 includes circuits, logic, interfaces and code to process the transmit signal for transmission. The processed transmit signal may be in quadrature form with I and Q components. The DAC 608 converts the digital transmit signal to an analog signal. The RFIC 610 may perform timing adjustment, modulation and frequency conversion and other functions, and provides an analog signal to the power amplifier 612. The power amplifier 612 amplifies the signal for transmission and applies the amplified signal to the antenna 614. The power amplifier 612 operates in response to a power supply voltage provided by the envelope tracking circuit 603.

In a similar manner the second transmit circuit 602 is suitable for transmission of radio signals to the remote radio. Preferably, using beamforming, a relative phase shift is applied to signals transmitted by the first transmit circuit 601 and the second transmit circuit 602 so that the signals are received coherently at the remote radio. The second transmit circuit 602 includes a phase shift 624, a transmit path 626, a digital to analog converter (DAC) 628, a RF IC 630, a PA 634 and an antenna 634. The phase shift 624 is representative of the phase shift imposed by the second transmit circuit 603 between the received transmit signal and radio frequency (RF) signals transmitted at the antenna 634. The transmit path 626 includes circuits, logic, interfaces and code to process the transmit signal for transmission. The processed transmit signal may be in quadrature form with I and Q components. The DAC 608 converts the digital transmit signal to an analog signal. The RF IC 630 may perform timing adjustment, modulation and frequency conversion and other functions, and provides an analog signal to the power amplifier 632. The power amplifier 632 amplifies the signal for transmission and applies the amplified signal to the antenna 634. The power amplifier 632 operates in response to a power supply voltage provided by the envelope tracking circuit 603.

The envelope tracking circuit 603 tracks the envelope of the transmit signal to produce a power supply voltage for powering the PA 612 and the PA 632. The envelope tracking circuit 603 includes and envelope tracking (ET) path 64, a DAC 646 and an ET switching power supply 648. The ET path includes features such as a modulus circuit and a shaping table for evaluating the envelope of the transmit signal and producing an envelope signal. The envelope signal is converted to an analog signal in the DAC 646 and provided to the ET switching power supply 648. The ET switcher 648 produces an envelope tracking power supply voltage on a common line 650 that is provided to both the PA 612 and the PA 632.

In operation, the transmit signal is received by the first transmit circuit 601, the second transmit circuit 602 and the ET circuit 603. The first transmit circuit 601 processes the transmit signal in baseband and converts the signal to an RF signal for amplification in the PA 612. The amplified signal is provided to the antenna 614 for transmission. Similarly, the second transmit circuit 602 processes the transmit signal in baseband and converts the signal to an RF signal for amplification in the PA 632. The amplified signal is provided to the antenna 634 for transmission. The ET circuit 603 processes the transmit signal to determine the envelope of the transmit signal. Based on the envelope of the transmit signal, the ET switcher 648 provides a power supply signal to both the PA 612 and the PA 632.

The magnitude of the supply voltage provided by the ET switching power supply 648 varies with the envelope of the transmit signal so that a larger supply voltage is provided to the PA 612 and the PA 632 when the envelope of the transmit signal is relatively large. This ensures that the PA 612 and the PA 632 have adequate voltage headroom to operate without clipping or saturating. Similarly, when the magnitude of the envelope of the transmit signal is relatively small, the magnitude of the supply voltage provided to the PA 612 and the PA 632 is reduced. In this manner, the power dissipation in the power amplifier is reduced, thereby reducing current drain from a battery that powers the wireless transceiver 600. The wireless transceiver 600 thus provides the benefits of reduced power consumption and beamforming transmission.

Figure 7:
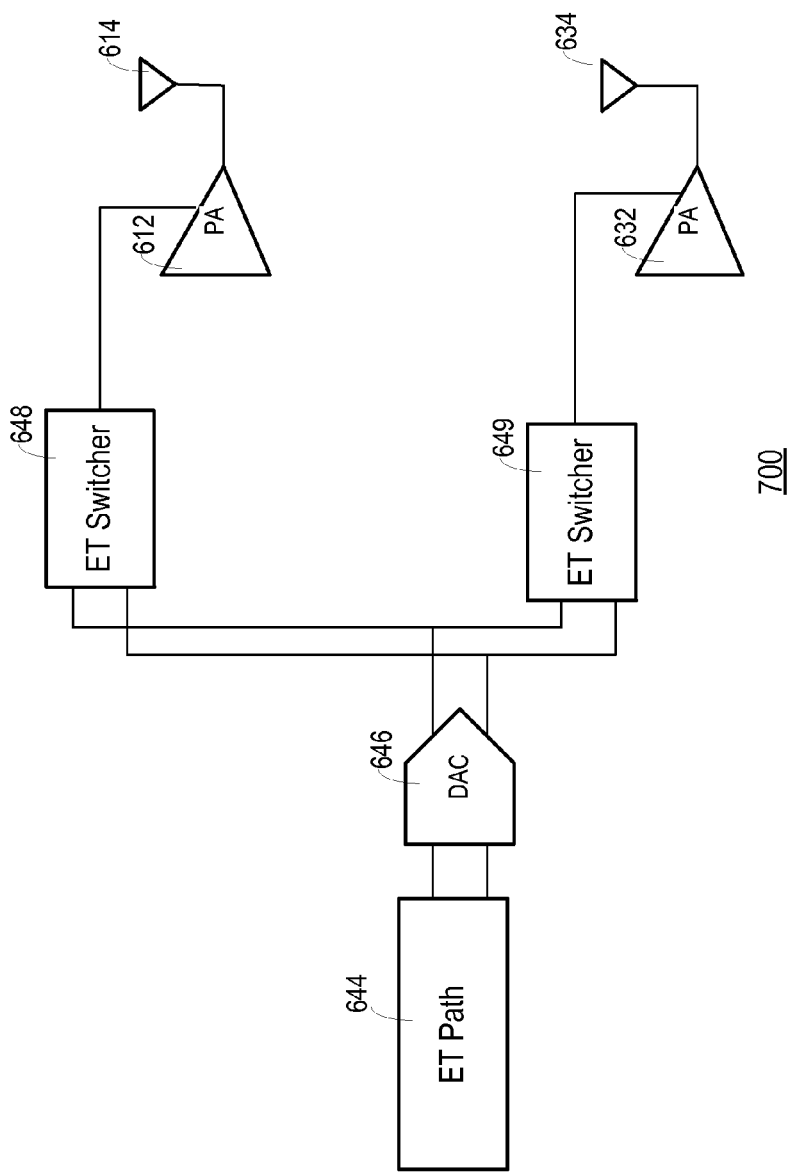
FIG. 7 is a block diagram of a portion of an exemplary wireless transceiver that is operable to perform uplink beamforming, in accordance with an embodiment of the invention.

FIG. 7 is a block diagram of a portion of an exemplary wireless transceiver 700 that is operable to perform uplink beamforming, in accordance with an embodiment of the invention. In the embodiment of FIG. 7, the single envelope tracking switching power supply 648 of FIG. 7 is replaced by two envelope tracking switching power supplies, 648, 649. Thus, each respective power amplifier 612, 632 is supplied with a respective power amplifier supply voltage by a respective envelope tracking switching power supply 648, 649. This embodiment may be preferable where the relative higher cost and power dissipation can be borne by the design without adverse effect or as a performance or other tradeoff. However, the envelope tracking switching power supplies 648, 649 are both driven by a common envelope tracking signal produced by the ET path 644 and the DAC 646.

From the forgoing, it can be seen that a single, frequency selective phase correction may be approximated as a single phase value for all channel estimates. In other words, a single phase difference is chosen so as to maximize received power at the base station or other remote radio, based on the measured receive channel and the difference between the receiver calibration delay and the transmitter calibration delay. A single ET switching power supply, or multiple ET switching power supplies, may be driven by a single envelope tracking signal to power the power amplifiers at the output of the transmitting radio.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   in a wireless communication device comprising a receiver, a transmitter, a plurality of power amplifiers coupled to a plurality of antennas and at least one envelope tracking power supply,
   simultaneously transmitting respective signals from two or more respective power amplifiers of the plurality of power amplifiers, the two or more power amplifiers powered by a common envelope tracking power supply, the respective signals transmitted phase shifted relative to one another so as to be received coherently at an intended receiver; and
   wherein a ratio of a first envelope of a first amplified transmit signal from a first respective power amplifier to a second envelope of a second amplified transmit signal from a second respective power amplifier is constant over a transmission from the wireless communication device.

2. The method of claim 1 wherein simultaneously transmitting comprises:
   transmitting from a first power amplifier a first signal; and
   transmitting from a second power amplifier a second signal,
   wherein the second signal is shifted in phase relative to the first signal.

3. A method comprising:
   at a telecommunication device,
   operating the telecommunication device to receive signals from a remote radio and determine a phase difference of signals received from the remote radio;
   operating the telecommunication device to transmit output signals in a time division duplexing mode of operation, including generating a transmit signal;
modifying characteristics of the generated transmit signal in at least one signal path of the telecommunication device to produce two or more modified signals, including using information from received signals to phase shift the two or more modified signals relative to one another so they are received coherently at an intended receiver;
amplifying the generated transmit signal and the two or more modified signals in a plurality of respective power amplifiers for transmission from a plurality of respective antennas, wherein a ratio of a first envelope of a first generated transmit signal from a first respective power amplifier to a second envelope of a second generated transmit signal from a second respective power amplifier is constant over a transmission from the telecommunication device;
in response to an envelope of the generated transmit signal, in a single envelope tracking power supply, generating a switched power amplifier voltage supply signal; and
applying the switched power amplifier voltage supply signal to the respective power amplifiers of the plurality of respective power amplifiers.

4. The method of claim 3 wherein producing two or more signals which are phase shifted comprises applying a constant phase shift to the two or more signals over a transmit band of frequencies.

5. The method of claim 3 further comprising:
estimating a phase difference of signals received from the remote radio at a plurality of antennas of the telecommunication device; and
transmitting as the output signals two signals that are shifted in phase relative to one another in response to the estimated phase difference.

6. The method of claim 3 further comprising:
receiving a signal from a remote radio;
detecting a phase shift message in the received signal; and
transmitting as the output signals two signals that are shifted in phase relative to one another using a phase difference communicated by the phase shift message.

7. The method of claim 3 further comprising:
determining a receive path phase difference of a plurality of receive paths of the telecommunication device;
determining a transmit path phase difference of a plurality of transmit paths of the telecommunication device; and
calibrating at least one of the receive path phase difference and the transmit path phase difference.

8. The method of claim 7 further comprising:
transmitting as the output signals two signals that are shifted in phase relative to one another using a phase difference determined using the calibration.

9. The method of claim 7 wherein transmitting the two signals comprises:
transmitting a first signal and a second signal with the respective power amplifiers of the telecommunication device, the second signal shifted relative to the first signal by the transmit path phase difference or the receive path phase difference.

10. The method of claim 7 wherein transmitting the two signals comprises:
transmitting a first signal and a second signal with the respective power amplifiers of the telecommunication device, the second signal shifted relative to the first signal by a difference between the transmit path phase difference and the receive path phase difference.

11. The method of claim 3 further comprising:
determining a first phase difference between a receive path and a transmit path of the telecommunication device on a first antenna;
determining a second phase difference between a receive path and a transmit path of the telecommunication device on a second antenna;
determining a difference between the first phase difference and the second phase difference; and
using the difference, adjusting phase of at least one of the transmit path on the first antenna and the transmit path on the second antenna.

12. A method comprising:
at a telecommunication device,
generating a transmit signal;
modifying characteristics of the generated transmit signal in at least one signal path of the telecommunication device to produce one or more modified signals;
amplifying the generated transmit signal and the one or more modified signals in a plurality of respective power amplifiers for transmission from a plurality of respective antennas;
in response to an envelope of the generated transmit signal, in a single envelope tracking power supply, generating a switched power amplifier voltage supply signal; and
applying the switched power amplifier voltage supply signal to the respective power amplifiers of the plurality of respective power amplifiers,
wherein a ratio of a first envelope of a first amplified transmit signal from a first respective power amplifier to a second envelope of a second amplified transmit signal from a second respective power amplifier is constant over a transmission from the telecommunication device.

13. A method comprising:
at a telecommunication device,
transmitting two respective transmitted signals from two respective power amplifiers of the telecommunication device, wherein each respective power amplifier is driven by a respective envelope tracking switching power supply, each respective envelope tracking switching power supply being driven by a common envelope tracking reference signal, the two respective transmitted signals being phase shifted relative to one another so as to be received coherently at an intended receiver; and
wherein a ratio of a first envelope of a first signal of the two respective transmitted signals to a second envelope of a second signal the two respective transmitted signals is substantially constant over a transmission from the telecommunication device.

14. The method of claim 13 wherein the respective envelope tracking switching power supplies are driven by one or more envelope tracking reference signals.

15. The method of claim 13 further comprising:
converting a common digital envelope tracking signal to respective envelope tracking reference signals for driving the each respective envelope tracking switching power supply.

16. The method of claim 13 wherein the respective envelope tracking switching power supplies are driven a common envelope tracking reference signal.

17. A telecommunication device comprising:
a first transmit circuit including a first power amplifier driving a first antenna, wherein the first transmit circuit is operative to transmit a first signal to a remote radio;

a second transmit circuit including a second power amplifier driving a second antenna, wherein the second transmit circuit is operative to transmit a second signal to the remote radio; and an envelope tracking circuit including one or more envelope tracking power supplies producing a switched power amplifier voltage supply signal, the switched power amplifier voltage supply signal being provided to the first power amplifier to power the first power amplifier and being provided to the second power amplifier to power the second power amplifier; and wherein a ratio of a first envelope of the first signal to a second envelope of the second signal is substantially constant over a transmission from the telecommunication device.

18. The telecommunication device of claim 17 wherein the telecommunication device further comprises:

a calibration generator operative to determine a phase difference between the first transmit circuit and the second transmit circuit and determine a constant phase difference to be maintained between the first signal and the second signal to ensure coherent reception of the first signal and the second signal at the remote radio.

* * * * *